United States Patent
Kim et al.

(10) Patent No.: US 7,988,234 B2
(45) Date of Patent: Aug. 2, 2011

(54) HEADREST FOR VEHICLE

(75) Inventors: Ki Nam Kim, Suwon-si (KR); Hyun Ko, Hwaseong-si (KR); Hae Il Jeong, Incheon (KR)

(73) Assignee: Hyundai Motor Company, Seoul (KR)

( * ) Notice: Subject to any disclaimer, the term of this patent is extended or adjusted under 35 U.S.C. 154(b) by 239 days.

(21) Appl. No.: 12/331,899

(22) Filed: Dec. 10, 2008

(65) Prior Publication Data
US 2009/0152924 A1 Jun. 18, 2009

(30) Foreign Application Priority Data
Dec. 14, 2007 (KR) .................. 10-2007-0131006

(51) Int. Cl.
A47C 7/36 (2006.01)
(52) U.S. Cl. ....................................... 297/408
(58) Field of Classification Search .............. 297/408, 297/403, 61
See application file for complete search history.

(56) References Cited

U.S. PATENT DOCUMENTS

| | | | |
|---|---|---|---|
| 6,129,421 A * | 10/2000 | Gilson et al. ............... | 297/408 |
| 6,302,485 B1 * | 10/2001 | Nakane et al. ............. | 297/408 |
| 6,880,890 B1 * | 4/2005 | DeBrabant ................. | 297/408 |
| 6,899,395 B2 * | 5/2005 | Yetukuri et al. ........... | 297/408 |
| 7,427,108 B2 * | 9/2008 | Hermansson et al. ..... | 297/408 |

FOREIGN PATENT DOCUMENTS
JP 2006-15021 A 1/2006
KR 10-2007-0097302 A 10/2007
* cited by examiner

*Primary Examiner* — David Dunn
*Assistant Examiner* — Tania Abraham
(74) *Attorney, Agent, or Firm* — Morgan, Lewis & Bockius LLP

(57) ABSTRACT

The present invention discloses a headrest for a vehicle which is constructed in such a way that a headrest body 100 of the headrest 1 can be folded by releasing the locking state with a fixed member 70 fixed on the horizontal frame portion 12 of the mounting frame 10 using a catch 60 that is rotated in an interlocking state with rotation of a lever 50.

7 Claims, 4 Drawing Sheets

HEADREST FOR VEHICLE

CROSS-REFERENCE TO RELATED APPLICATIONS

The present application is based on and claims priority from Korean Patent Application No. 10-2007-0131006 filed Dec. 14, 2007, the entire contents of which application is incorporated herein for all purposes by reference.

BACKGROUND OF THE INVENTION

1. Field of the Invention

The present invention relates to a headrest for a vehicle, more specifically to a headrest for a vehicle which is constructed in such a way that the headrest can be folded by releasing the locking state with a fixed member using a catch that is rotated in an interlocking state with rotation of a lever.

2. Description of the Related Art

In general, a headrest is installed at the top end of the front seat of a vehicle in such a way that it can be pulled up or down. The functions of such a headrest are to let the passenger lean their head to rest at normal times and to protect the head and neck of the passenger from shock in case shock is applied to the vehicle.

Such a conventional headrest has a problem in that, because it was combined and fixed to the top end of the seat back by a height-adjustable mechanism, it obstructed rear viewing from the vehicle in case the passenger, especially the driver, has to view to the rear.

The information disclosed in this Background of the Invention is only for enhancement of understanding of the general background of the invention and should not be taken as an acknowledgement or any form of suggestion that this information forms the prior art already known to a person skilled in the art.

BRIEF SUMMARY OF THE INVENTION

Various aspect of the present invention is directed to provide for a headrest of a vehicle which is constructed in such a way that the headrest can be folded by releasing the locking state with a fixed member using a catch that is rotated in an interlocking state with rotation of a lever. As such, headrests in accordance with the present invention may have the effect whereby the rear viewing of the passenger can be secured sufficiently.

One aspect of the present invention is directed to a headrest for a vehicle including an inverse U-shaped mounting frame removably mounted on top of a backrest in a vehicle and having a horizontal frame portion, a headrest body including a first body section and a second body section disposed facing each other, a tilt bracket integrally coupled with the first and second body sections of the headrest body and rotatably mounted on the horizontal frame portion, so that the headrest body may be pivotably mounted on the mounting frame, a driving shaft with one end rotatably installed in the tilt bracket and a second end positioned to protrude from the headrest body, a knob which may be attached to the second end of the driving shaft, a lever which may be fixed on the driving shaft within the tilt bracket and which pivots with the driving shaft when rotated by the knob, a catch which may be rotatably mounted on a rotating axis installed transversely through the tilt bracket so as to be rotated by rotation of the lever, and having an elongated catching portion, and/or a fixed member fixed on the horizontal frame portion of the mounting frame, and having a first slot portion dimensioned and configured to engage with the elongated catching portion; and a second slot portion at a predetermined distance away from the first slot portion.

The driving shaft may be provided with a first return spring that supplies restoring force to the lever when releasing the pivoted lever. The first return spring may be wound about the driving shaft, and one end of the first return spring may be caught on the inside of at least one leg portion of the lever and the other end may be caught in a spring slot of the tilt bracket.

The horizontal frame portion may be provided with a second return spring that supplies restoring force to the tilt bracket when returning the headrest body to an original position. The second return spring may be wound about the horizontal frame portion, and one end of the second return spring may be caught on the fixed member and the other end of the second return spring may be caught on the tilt bracket.

The fixed member further may include a first stopping means to restrict the movement of the fixed member when unlocked and a second stopping means to restrict the movement of the fixed member when folded. The first stopping means may include a first stopper formed on the fixed member and a first catch formed on the inside of the headrest body for the first stopper to be caught on. The second stopping means may include a second stopper formed on the fixed member, and a second catch formed on the inside of the headrest body for the second stopper to be caught on.

A Passenger Vehicle Including any of the Above-Described Headrests for a Vehicle The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
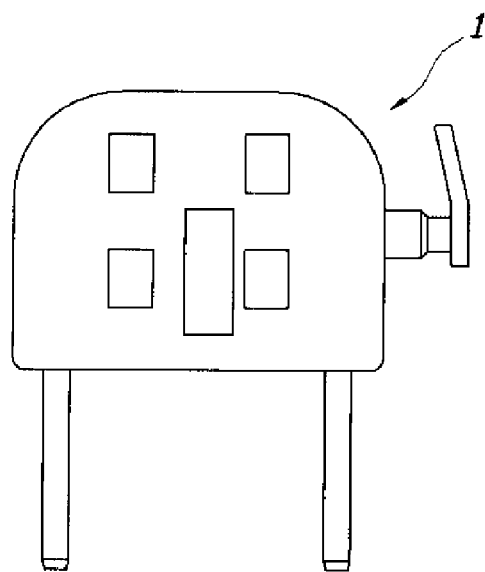
FIG. 1 is a schematic view showing an exemplary headrest for a vehicle according to the present invention.

FIG. 1 is a schematic view showing a headrest for a vehicle according to the present invention.

As shown in FIG. 1, the headrest 1 of a vehicle of the present invention is installed on top of a backrest (not shown) such that it can be adjustably moved upward and downward. The headrest 1 of the present invention is also constructed in such a way that it can be folded against the backrest as described below.

Figure 2:
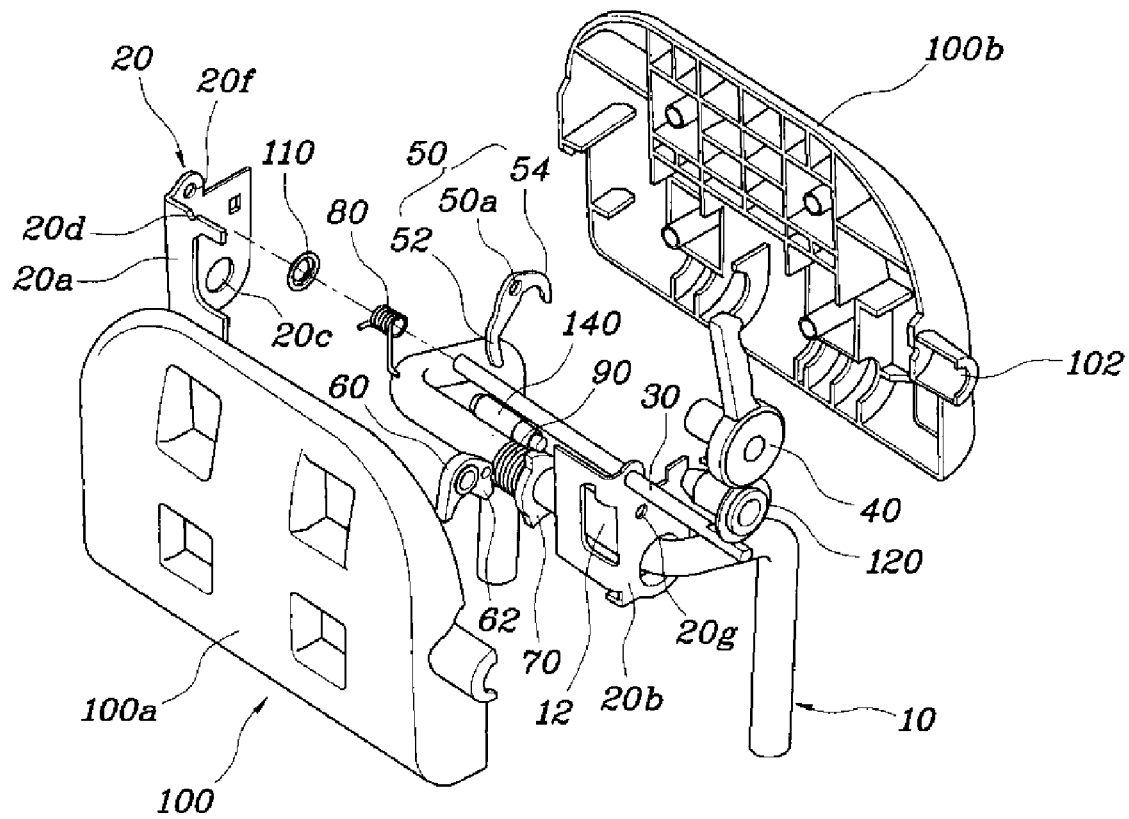
FIG. 2 is an exploded perspective view showing the exemplary headrest for a vehicle according to the present invention.
Figure 3:
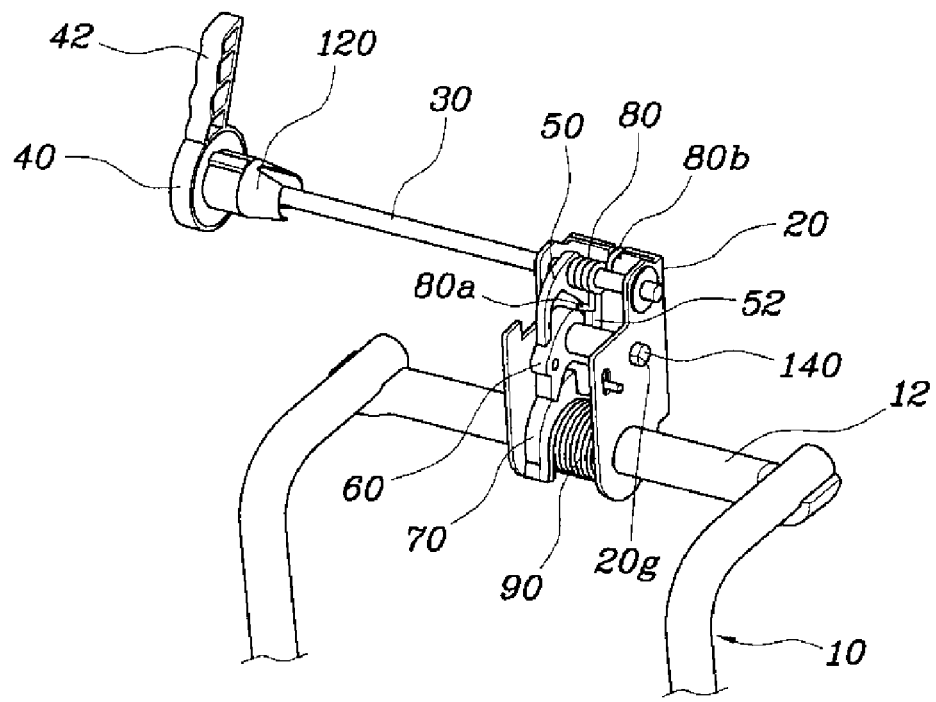
FIG. 3 is a perspective view showing major parts of the exemplary headrest for a vehicle according to the present invention.

FIG. 2 is an exploded perspective view of a headrest according to the present invention, and FIG. 3 is a perspective view showing how the mounting frame, tilt bracket, lever, driving shaft and knob in the vehicle headrest of FIG. 2 may generally fit together.

As illustrated in FIG. 2 and FIG. 3, the headrest 1 according to the present invention comprises a headrest body 100 which includes a plurality of components for pivoting the headrest 1 as described below. The headrest body 100 has a first body section 100a and a second body section 100b which can be assembled in correspondence with each other to face one another. The headrest body 100 may be pivotably mounted at a predetermined angle on a roughly inverse U-shaped mounting frame 10 having a horizontal frame portion 12.

A tilt bracket 20 may be mounted on the mounting frame 10, which may be mounted on top of the backrest in such a way that it can be pulled out. In some aspects of the invention, the tilt bracket 20 is integrally coupled with body sections 100a and 100b and rotatably mounted on the horizontal frame portion 12 through a hole 20c in tilt bracket 20. In this manner, the headrest body 100 can be pivotably mounted on the mounting frame 10 at a predetermined angle.

The tilt bracket 20 may include a left bracket section 20a and a right bracket section 20b to be easily combined with the horizontal frame portion 12, and they, both of which are combined with each other to be assembled with the brackets 20a and 20b mounted on the horizontal frame portion 12. In the assembled tilt bracket 20, a space is formed in which a plurality of components for pivoting the headrest 1 are placed as described below.

Meanwhile, on one side of the headrest body 100 is formed a combining cylinder 102, allowing the mounting of a knob case 120 therein, is formed on one side of the headrest body 100 is formed. The knob case 120 can serve as a rotatably supporting connection of knob 40 to the headrest body 100. The knob 40 is fixed to one end of a driving shaft 30, which is rotated simultaneously with the turning of knob 40.

One end of driving shaft 30 may pass through the combining cylinder 102 and protrude from the headrest body 120 so as to affix knob case 120 and/or knob 40. The other end of driving shaft 30 may pass through holes 20f formed in both bracket sections 20a and 20b, and is thereby rotatably mounted to tilt bracket 20. In this manner, the driving shaft 30 can be rotatably supported by tilt bracket 20 in an interlocking state with rotation of knob 40.

On the end of driving shaft 30, which protrudes from left bracket section 20a, may be fastened a push nut 110 to prevent the driving shaft 30 from coming off the tilt bracket 20. The other end of the driving shaft 30 is processed to be flat to prevent the circumferential rotation of the knob 40 during operation.

Meanwhile, a lever 50 is located within tilt bracket 20. The lever 50 is fixed on the driving shaft 30 through hole 50a formed in a central portion of lever 50, so that it is rotated with the turning of driving shaft 30, which is rotatable with knob 40. In some aspects of the invention, a key or combine is used in a close fitting method to prevent circumferential rotation on the driving shaft 30 when fixing the lever 50. The lever 50 is provided with a first leg portion 52 and a second leg portion 54 which extended downwards from the central portion at a predetermined angle from each other.

In addition, the driving shaft 30 may be provided with a first return spring 80 to supply restoring force to the lever 50 so as to return a headrest body 100 folded by rotation of the tilt bracket 20 to the original state. The first return spring 80 is wound about the driving shaft 30, and one end 80a of the first return spring 80 is caught on the inside of at least one leg portion of lever 50 (for example, the first leg portion 52 in FIG. 4) and the other end is caught in a spring slot 20d of tilt bracket 20. Therefore, when the user rotates the handle 42 of knob 40, it is rotated together with headrest 1 of the present invention. Then, if the user releases the handle 42, the lever 50 is pivoted back to the original position by elastic force of the first return spring 80, thereby returning the knob 40 to the original position through the driving shaft 30.

Figure 4:
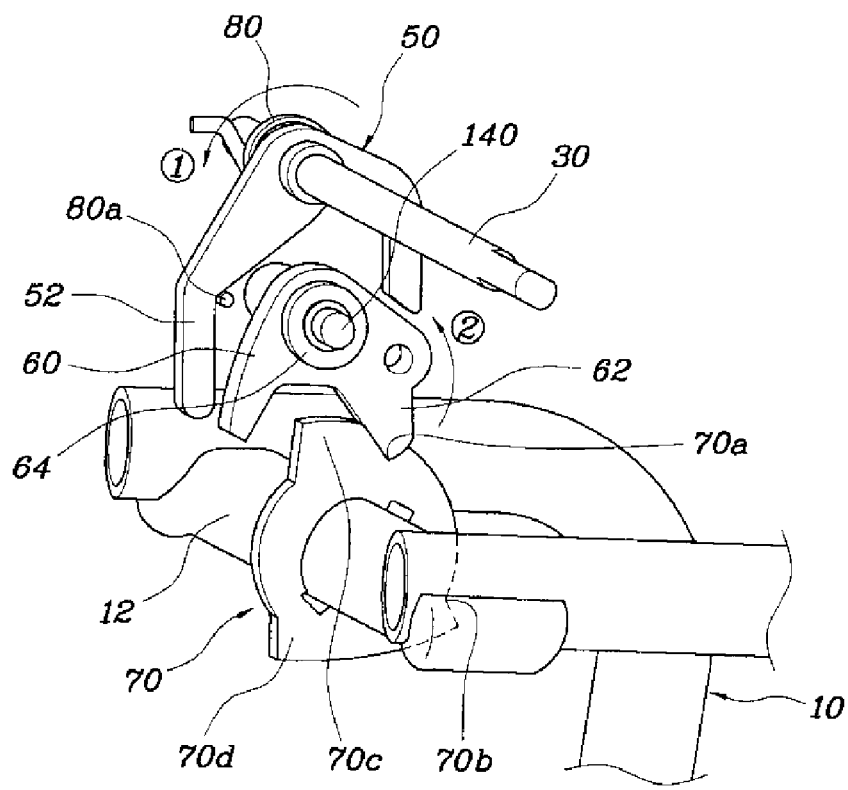
FIG. 4 is a perspective view showing an exemplary operating principle of the exemplary headrest for a vehicle according to the present invention.

Within tilt bracket 20 is installed a rotating axis 140. Both ends of the rotating axis 140 are inserted through holes 20g formed on both sections (20a and 20b) of tilt bracket 20. A catch 60 is rotatably installed on the rotating axis 140 so that it is pressed by the first leg portion 52 of the lever 50 and is freely rotated as the lever 50 rotates. As illustrated in FIG. 4, an elongated catching portion 62 is formed on catch 60. In order to reduce noise and friction generated when catch 60 is rotating, it may be preferable to install the catch 60 on the rotating axis 140 using any bushing 64 or plastic bearing known in the art.

A fixed member 70 is fixed on the horizontal frame portion 12 of the mounting frame 10 is fixed a fixed member 70. On the outer circumference of the fixed member 70 has a first slot portion 70a dimensioned and configured to engage with the elongated catching portion 62 of the catch 60 and a second slot portion 70b in a position at a given interval, that is, at a predetermined distance away from the first slot portion 70a.

Furthermore, a second return spring 90 may be wound about the horizontal frame portion 12, and one end of the second return spring 90 is caught on the fixed member 70 and the other end of the second return spring 90 is caught on the tilt bracket 20. The second return spring 90 supplies restoring force to the tilt bracket 20 when the headrest body 100 that was folded by rotation of the tilt bracket 20 is returned to the original state so that it can be returned easily.

Therefore, when the user returns the folded headrest of the present invention to the original state, the tilt bracket 20 that is integrally coupled with the headrest body 100 is returned by elastic force of the second return spring 90, which is wound about horizontal frame portion 12. In this manner, the headrest of the present invention can be returned to the original state with less force.

The headrest for a vehicle of the present invention further includes a first stopping means to restrict the movement of the headrest body 100 about the mounting frame 10 during the unlocking state and a second stopping means to restrict the movement of the headrest body 100 about the mounting frame 10 during the folded state.

The first stopping means includes a first stopper 70c formed on the fixed member 70 in protrusion and extended from the first slot portion 70a of the fixed member 70, and a first catch 100c formed on the inside of the headrest body 100 for the first stopper 70c to be caught on.

The second stopping means includes a second stopper 70d formed on the fixed member 70 in protrusion and extended from the second slot portion 70b, and a second catch 100d formed on the inside of the headrest body 100 for the second stopper 70d to be caught on.

As described above, the fixed member 70 is provided with a first stopper 70c which is extended from the first slot portion 70a and is formed in protrusion and a second stopper 70d which is extended from the second slot portion 70b and is formed in protrusion.

As shown in FIGS. 5A to 5D, on the inner surface of the headrest body 100 are formed a first catch 100c which can engage with the first stopper 70c and a second catch 100d which can engage with the second stopper 70d.

The operating principle of the headrest for a vehicle according to the present invention will now be further described. As Referring to FIG. 4, the operating principle of the headrest for a vehicle according to the present invention will be generally described.

When the user rotates knob 40 by turning handle 42, the driving shaft 30 is rotated in the ① direction while the lever 50 is also rotated in the same ① direction. Therefore, when the first leg portion 52 of the lever 50 comes into contact with catch 60, pressing against it, catch 60 is rotated in the ② direction with rotating axis 140. Therefore, the elongated catching portion 62 of the catch 60 rotates with catch 60, releasing the catching state for the first slot portion 70a of the fixed member 70. The fixed state of the catch 60 against the fixed member 70 of the horizontal frame portion 12 is thereby released, so the user can fold the headrest of the present invention by rotating it at a predetermined or certain angle to the mounting frame 10.

Meanwhile, when the lever 50 is rotated with the headrest of the present invention in the folded state, catch 60 is rotated in an interlocking state with the first leg portion 52 and the catching state of the catch 60 against the fixed member 70 is released, so that the headrest is pivoted in the reverse direction to be returned to the original state.

Figure 5A:
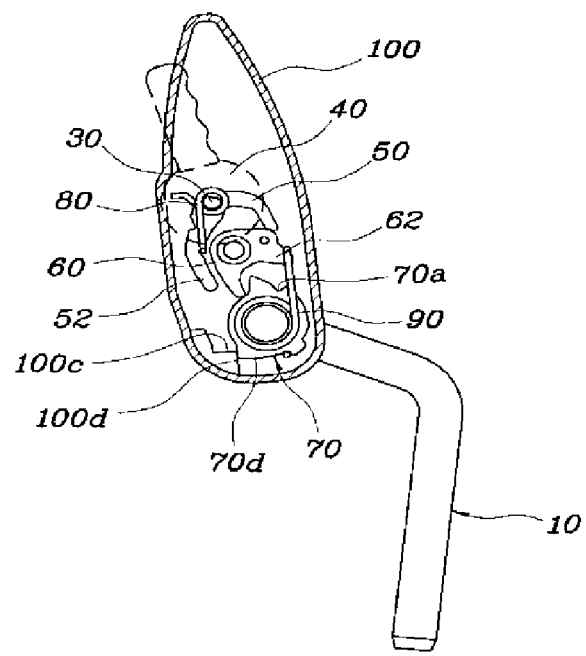
FIGS. 5A to 5D are sectional views showing an original state, an unlocked state, the state being folded, and the folded state, respectively, for the exemplary headrest for a vehicle according to the present invention.
Figure 5B:
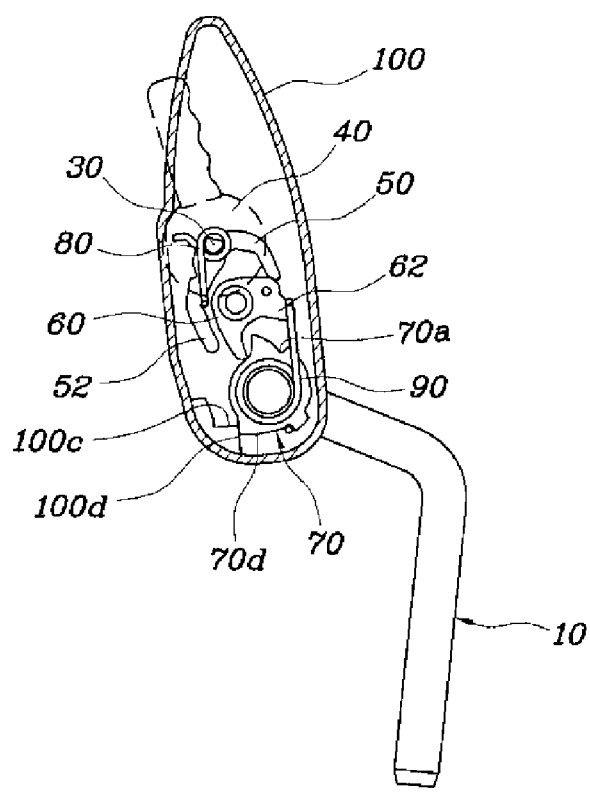

With reference to FIGS. 5A to 5B, the operating process of the headrest for a vehicle according to the present invention will now be more specifically described. FIG. 5A is a sectional view showing the original state (unfolded state) in which the headrest of the present invention is installed vertically. In this state, the knob 40 is in a state disposed vertically and parallel with headrest body 100, and the elongated catching portion 62 of the catch 60 is caught in the first slot portion 70a of the fixed member 70 so as to prevent the pivoting of the headrest.

In order to fold the headrest of the present invention, the user has to release the catching state, and FIG. 5B shows how this is accomplished. Firstly, the user rotates the knob 40 at a predetermined angle in a direction, e.g. counterclockwise direction in the drawing, which is the opposite direction of how headrest body 100 is folded. Accordingly, as the knob 40 is rotated, the first leg portion 52 of the lever 50 fixed on the driving shaft 30 comes into contact with the outer circumference of the catch 60 to press and rotate it. Therefore, the elongated catching portion 62 that was caught in the first slot portion 70a then comes off to release the catching state, thereby freeing the catch 60 from the fixed member 70.

But as described above, in the case of releasing the catching state by rotation of knob 40, there is a problem that the headrest could be rotated excessively in the reverse direction to be folded, that is, a counterclockwise direction in the drawing. To prevent this, a second stopper 70d may be formed on the fixed member 70. In case the headrest body 100 is rotated in the reverse direction at a given angle, the second stopper 70d of the fixed member 70 is caught by a second catch 100d formed on the inside of the headrest body 100, so additional pivoting at more than a given angle can be prevented.

Figure 5C:
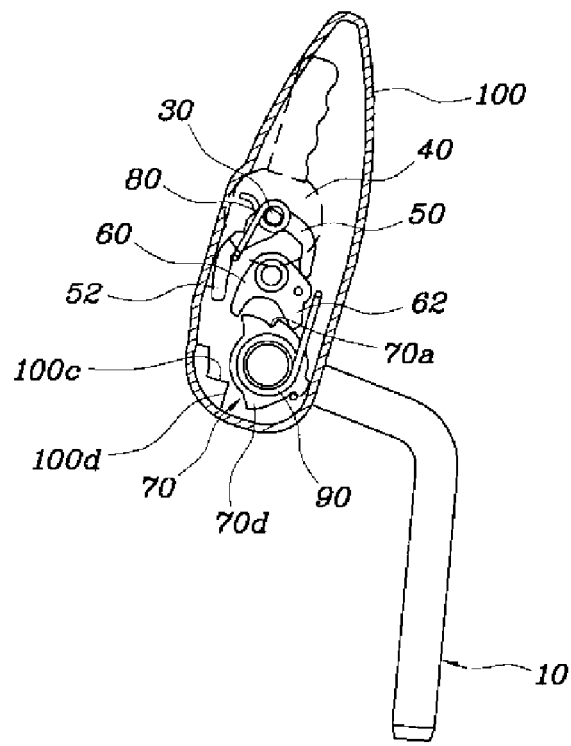

FIG. 5C is a sectional view showing the state in which the user pivots the headrest of the present invention to obtain a rear view. As described above, if the catching state of the catch 60 against the fixed member 70 is released to make the headrest body 100 rotate, the lever 50 and the catch 60 also rotate together with the headrest body 100 centering on the horizontal frame portion 12 which fixes the fixed member 70. At this time, the elongated catching portion 62 of the catch 60, which has disengaged from the first slot portion 70a of the fixed member 70, moves toward the second slot portion 70b of the fixed member 70 along the outer circumference of the fixed member 70. When the catch 60 is rotating, the return spring 90, one end of which is caught on one side of the tilt bracket 20 and the other end of which is caught on the fixed member 70, is stretched while elastic energy is stored therein.

Figure 5D:
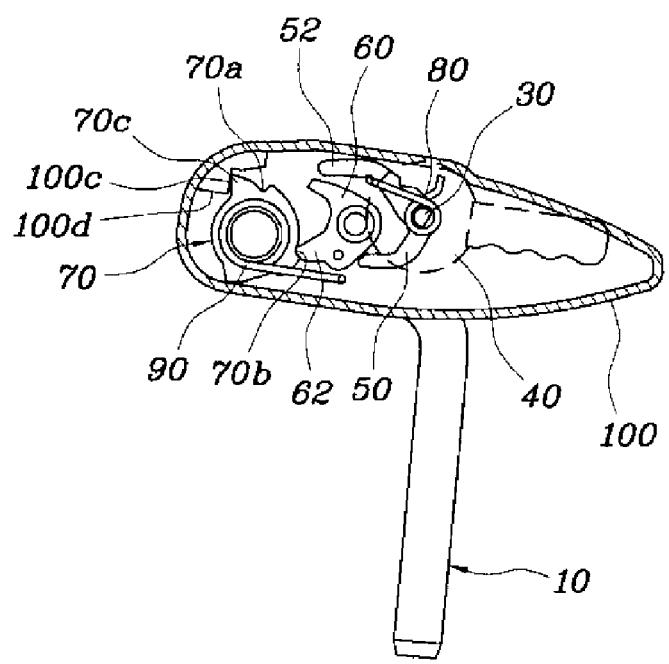

FIG. 5D is a sectional view showing a state in which the headrest of the present invention is rotated and completely folded. Where the headrest body 100 is completely folded, the elongated catching portion 62 of the catch 60 is caught in the second slot portion 70b of the fixed member 70. In this state, the return spring 90 maintains a stretched state. Meanwhile, if the user pivots the knob 40 at a given angle to release the folding state of the headrest body 100, the operating force of the knob 40 is transmitted to the lever 50 through the driving shaft 30. If the first leg portion 52 presses catch 60 by the pivoting of the lever 50, the catch 60 rotates with the center on the rotating axis 140 while the elongated catching portion 62 of the catch 60 that was caught in the second slot portion 70b comes off to release the catching state of the catch 60 against the fixed member 70. In this manner, the user can return the headrest body 100 to its original state. At this time, the tilt bracket 20 is pressed by the elastic energy that was stored in the second return spring 90 during stretching, so the user can return the headrest body 100 to the original state with less force.

Even in the case where the headrest body 100 is rotatable because the elongated catching portion 62 of the catch 60 is not properly caught in the second slot portion 70b accurately, the excessive clockwise rotation of the headrest body 100 can be prevented because the fixed member 70 is provided with first stopper 70c protruded from the outer circumference and the headrest body 100 is provided with the first catch 100c on the inside.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A headrest for a vehicle comprising:
   an inverse U-shaped mounting frame removably mounted on top of a backrest in a vehicle and having a horizontal frame portion;
   a headrest body including a first body section and a second body section disposed facing each other;
   a tilt bracket integrally coupled with said first and second body sections of the headrest body and rotatably mounted on the horizontal frame portion, so that said headrest body is pivotably mounted on said mounting frame;

a driving shaft with one end rotatably installed in said tilt bracket and a second end positioned to protrude from said headrest body;

a knob which is attached to the second end of said driving shaft;

a lever which is fixed on said driving shaft within said tilt bracket and which pivots with said driving shaft when rotated by said knob;

a catch which is rotatably mounted on a rotating axis installed transversely through the tilt bracket so as to be rotated by rotation of said lever, and having an elongated catching portion; and a fixed member fixed on the horizontal frame portion of said mounting frame, and having a first slot portion dimensioned and configured to engage with the elongated catching portion; and a second slot portion at a predetermined distance away from the first slot portion; and wherein said driving shaft is provided with a first return spring that supplies restoring force to said lever when releasing the pivoted lever; and wherein the first return spring is wound about the driving shaft, and one end of the first return spring is caught on the inside of at least one leg portion of the lever and the other end is caught in a spring slot of the tilt bracket.

2. The headrest for a vehicle of claim 1, wherein said horizontal frame portion is provided with a second return spring that supplies restoring force to said tilt bracket when returning said headrest body to an original position.

3. The headrest for a vehicle of claim 2, wherein the second return spring is wound about the horizontal frame portion, and one end of the second return spring is caught on the fixed member and the other end of the second return spring is caught on the tilt bracket.

4. The headrest for a vehicle of claim 1, wherein the fixed member further includes a first stopping means to restrict the movement of the headrest body when unlocked and a second stopping means to restrict the movement of the headrest body when folded.

5. The headrest for a vehicle of claim 4, wherein said first stopping means includes a first stopper formed on the fixed member and a first catch formed on the inside of said headrest body for said first stopper to be caught on.

6. The headrest for a vehicle of claim 4, wherein said second stopping means includes a second stopper formed on said fixed member, and a second catch formed on the inside of said headrest body for said second stopper to be caught on.

7. A passenger vehicle comprising the headrest for a vehicle of claim 1.

* * * * *